US011187892B2

(12) United States Patent
He (10) Patent No.: US 11,187,892 B2
(45) Date of Patent: Nov. 30, 2021

(54) WEDGE MECHANISM FOR LIGHT MODULATOR IMAGE ADJUSTMENT

(71) Applicant: CHRISTIE DIGITAL SYSTEMS USA, INC., Cypress, CA (US)

(72) Inventor: Guo Qing He, Kitchener (CA)

(73) Assignee: CHRISTINE DIGITAL SYSTEMS USA, INC., Cypress, CA (US)

( * ) Notice: Subject to any disclaimer, the term of this patent is extended or adjusted under 35 U.S.C. 154(b) by 321 days.

(21) Appl. No.: 16/512,768

(22) Filed: Jul. 16, 2019

(65) Prior Publication Data

US 2021/0018747 A1  Jan. 21, 2021

(51) Int. Cl.

| G03B 21/14 | (2006.01) |
| G02B 7/00 | (2021.01) |
| G02B 26/12 | (2006.01) |
| G02B 26/10 | (2006.01) |
| H04N 9/31 | (2006.01) |
| G02F 1/16753 | (2019.01) |
| G03B 21/20 | (2006.01) |

(52) U.S. Cl.
CPC ............. *G02B 26/12* (2013.01); *G02B 7/006* (2013.01); *G02B 26/10* (2013.01); *G02B 26/121* (2013.01); *G02F 1/16753* (2019.01); *G03B 21/145* (2013.01); *G03B 21/2006* (2013.01); *H04N 9/3141* (2013.01)

(58) Field of Classification Search
CPC .... G03B 21/145; G03B 21/142; G03B 21/14; G02B 7/003; G02B 7/004; G02F 1/16753; H04N 9/3141
See application file for complete search history.

(56) References Cited

U.S. PATENT DOCUMENTS

| 5,523,883 | A | 6/1996 | Myers et al. |
| 6,056,407 | A * | 5/2000 | Iinuma ............... G02B 27/1046 348/E5.141 |
| 7,630,624 | B2 | 12/2009 | Chang |
| 2002/0034023 | A1 | 3/2002 | Smith et al. |
| 2003/0118278 | A1 | 6/2003 | Yoon et al. |
| 2009/0034043 | A1 | 2/2009 | Kaeriyama |
| 2011/0019158 | A1 | 1/2011 | He |
| 2018/0115753 | A1 | 4/2018 | Ohno |

FOREIGN PATENT DOCUMENTS

EP  2280551 A1  2/2011

* cited by examiner

*Primary Examiner* — Ryan D Howard
(74) *Attorney, Agent, or Firm* — Perry + Currier, Inc.

(57) ABSTRACT

A wedge mechanism for light modulator image adjustment is provided. In particular, a device is provided comprising: a first plate; a second plate for receiving a light modulator; one or more biasing mechanisms to bias the second plate in a biased position relative to the first plate, to allow the second plate to move with respect to the first plate; first and second wedge devices configured respectively interact with a first and second edges of the second plate to move the second plate, relative to the first plate, against the one or more biasing mechanisms, the second edge of the second plate being about perpendicular to the first edge of the second plate; and first and second wedge device adjustment mechanisms configured to respectively adjust positions of the first and second wedges device relative to the first and second edges, to move the second plate.

13 Claims, 4 Drawing Sheets

WEDGE MECHANISM FOR LIGHT MODULATOR IMAGE ADJUSTMENT

BACKGROUND

Projectors usually include an image modulator for each of red, green and blue light, such that three image modulators form red, green and blue sub-images which are combined to form images being projected. Hence, it is important that the red, green and blue sub-images be aligned on a pixel-by-pixel basis, which can be challenging. In particular, pixel sizes for digital micromirror devices (DMDs), often used as image modulators in projectors, are becoming smaller and smaller, for example, about 5 to 6 microns on a side, which makes the alignment problem more acute. Further, conventional mechanical image adjusting (e.g., convergence) is generally not suitable for such small pixel resolution adjustment.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Projectors usually include an image modulator for each of red, green and blue light, such that three image modulators form red, green and blue sub-images which are combined to form images being projected. Hence, it is important that the red, green and blue sub-images be aligned on a pixel-by-pixel basis, which can be challenging. In particular, pixel sizes for digital micromirror devices (DMDs), often used as image modulators in projectors, are becoming smaller and smaller, for example, 5 microns, which makes the alignment problem more acute. Further, conventional mechanical image adjusting (e.g., convergence) is generally not suitable for such small pixel resolution adjustment.

For example, a light engine in a digital projector generally separate lights from lamps and/or lasers, into red, green and blue colors, and each color illuminates a respective light modulator (e.g. a DMD); sub-images formed by the DMDs are combined into an image projected onto a screen. To get a perfect projected image on the screen, all three sub-images should converge, as-projected, onto the screen within a certain specification. While sub-images formed by DMDs and/or light modulators with larger pixels (e.g. over 10 to 14 microns on a side) may be aligned using the conventional convergence method, for example using screws and/or screw combinations to move a DMD, adjusting sub-images formed by DMDs and/or light modulators with pixels of less than 10 microns has become challenging.

To address this, the present specification provides a device comprising: a first plate; a second plate adapted for receiving a light modulator; one or more biasing mechanisms configured to bias the second plate in a biased position relative to the first plate, the one or more biasing mechanisms configured to allow the second plate to move with respect to the first plate; a first wedge device configured to interact with a first edge of the second plate to move the second plate, relative to the first plate, against the one or more biasing mechanisms; a second wedge device configured to interact with a second edge of the second plate to move the second plate, relative to the first plate, against the one or more biasing mechanisms, the second edge of the second plate being about perpendicular to the first edge of the second plate; at least one first wedge device adjustment mechanism configured to adjust a position of the first wedge device relative to the first edge, to move the second plate; and at least one second wedge device adjustment mechanism configured to adjust a position of the second wedge device relative to the second edge, to move the second plate.

Figure 1:
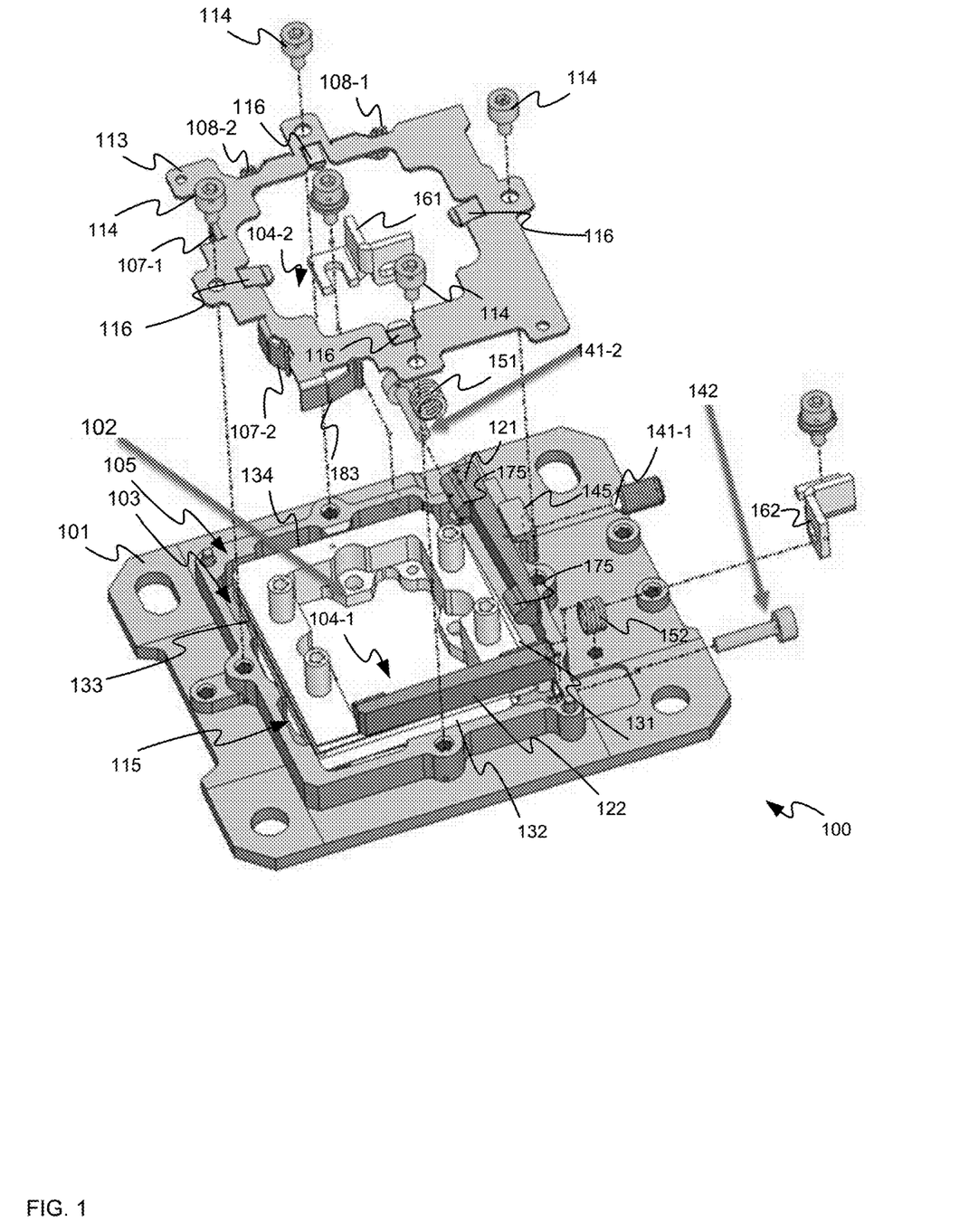
FIG. 1 depicts an exploded view of a device that includes a wedge mechanism for light modulator image adjustment, according to non-limiting examples.
Figure 2:
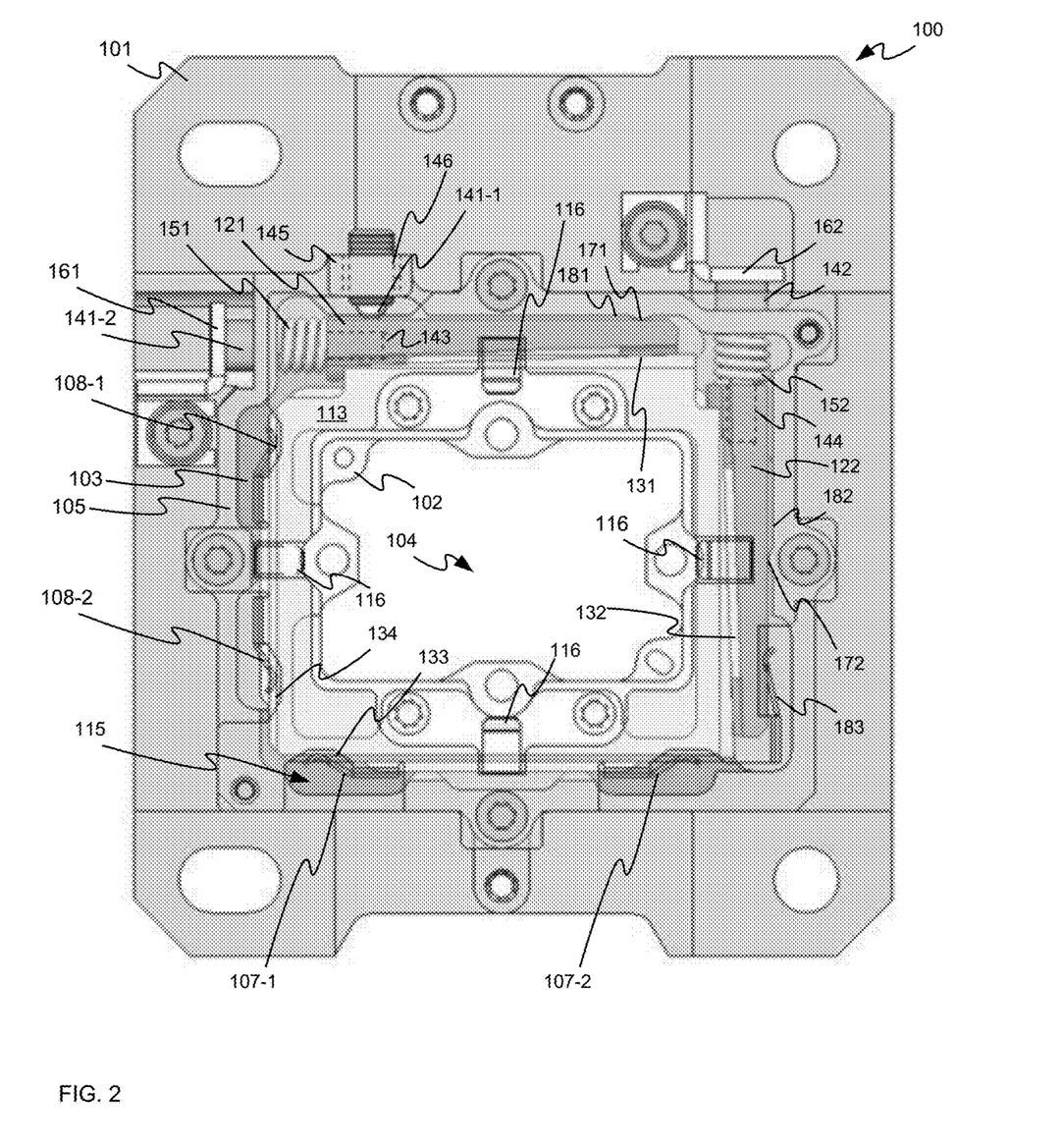
FIG. 2 depicts a rear view of the device of FIG. 1, as assembled, according to non-limiting examples.

Attention is next directed to FIG. 1 and FIG. 2 which respectively depict an exploded and assembled rear view of a device 100 that includes a wedge mechanism for light modulator image convergence. The device 100 may be one of three devices of a light modulating assembly for a projector, that light modulating assembly including three image modulators, one for each of red, green and blue light, which form respective sub-images which are combined by projector optics into an image for projection; each of the three light modulators may be mounted to a respective device 100 which is used to finely adjust a position of a respective light modulator as described hereafter, such that pixels of the sub-images align. Alternatively, such a light modulating assembly may include one fixed position light modulator and two devices 100 to which each of a remaining two light modulators are mounted; in such an example, positions of the two light modulators mounted to a respective device 100 are adjustable.

The device 100 comprises a first plate 101 and a second plate 102, the second plate 102 adapted for receiving a light modulator via any of various suitable attachment mechanisms, as describe in more detail below. Such a light modulator may include, but is not limited to, a digital micromirror device (DMD), a liquid crystal on silicon (LCOS) device, and the like.

In general, the first plate 101 may be mountable to a light modulating assembly for a projector, and the position of the first plate 101 may be fixed relative to the light modulating assembly when mounted thereto.

As depicted, the first plate 101 comprises a ledge 103 surrounding an aperture 104-1, the ledge 103 and aperture 104-1 having respective shapes complementary to the second plate 102, such that the second plate 102 may be supported by, and/or reside on, the ledge 103. As depicted, the ledge 103 and aperture 104-1 are surround by a wall 105 extending from the first plate 101. Hence, an edge of a face (e.g. on a side opposite that depicted in FIG. 1) of the second plate 102 generally resides on the ledge 103, surrounded by the wall 105, with the wall 105 containing the second plate 102 when the second plate 102 resides on the ledge 103. The ledge 103 and the wall 105 generally have shapes and/or dimensions larger than the dimensions of the second plate 102 such that the second plate 102 may move within the wall 105 when residing on the ledge 103 (e.g. as depicted in FIG. 2).

The aperture 104-1 may further have dimensions and/or a shape 104-1 suitable for assisting with cooling a light modulator mounted to the second plate 102 (e.g. at a side depicted in FIG. 2), with the light modulator being illuminated by light of a particular color (e.g. red, green or blue) from a light engine, and the like, such that the light modulator modulates the light of the particular color into a sub-image to be combined with sub-images of other colors into an image for projection, as described above.

In general, the second plate 102 may move on the ledge 103, within the wall 105, as described hereafter, using a wedge mechanism to adjust the position of the second plate 102 relative to the first plate 101, which in turn adjusts a position of a light modulator received at and/or attached to and/or mounted to the second plate 102. Such adjustment may include rotation of the second plate 102 and/or moving the second plate linearly in two perpendicular directions, as described in more detail below with regards to FIG. 3 and FIG. 4.

The device 100 further includes one or more biasing mechanisms 107-1, 107-2, 108-1, 108-2 configured to bias the second plate 102 in a biased position relative to the first plate 101 (e.g. on the ledge 103 and/or within the wall 105), the one or more biasing mechanisms 107-1, 107-2, 108-1, 108-2 configured to allow the second plate 102 to move with respect to the first plate 101. The biasing mechanisms 107-1, 107-2 will be referred to hereafter, collectively, as the biasing mechanisms 107 and, generically, as a biasing mechanism 107; similarly, biasing mechanisms 108-1, 108-2 will be referred to hereafter, collectively, as the biasing mechanisms 108 and, generically, as a biasing mechanism 108.

As depicted, the biasing mechanisms 107, 108 are attached to a third plate 113 which attaches to the first plate 101 via any suitable fastening mechanism, as depicted screws 114 that extend through respective holes, and the like, in the third plate 113, and which are received in respective threaded holes of the first plate 101; hence, when the plates 101, 102, 113 are assembled, as in FIG. 2, the second plate 102 is sandwiched between the first plate 101 and the third plate 113. The third plate 113 is depicted as transparent in FIG. 2 to show the position of the second plate 102 relative to the other components of the device 100, when the plates 101, 102, 113 are assembled.

In general, the third plate 113 also comprises an aperture 104-2 through which the light modulator may be mounted to the second plate 102. Hence, for example, the aperture 104-2 may be sized and/or of dimensions which allow for the light modulator to be mounted to the second plate 102 via any suitable attachment mechanism (e.g. screw, bolts, and the like, which extend through holes, and the like, in the second plate 102) and attach to the light modulator. The apertures 104-1, 104-2 will be collectively referred to hereafter as the apertures 104, as indicated in FIG. 2.

As depicted, the biasing mechanisms 107, 108 each comprise respective flat springs and the like, which extend perpendicularly from the third plate 113 and are located in a gap 115 formed by respective edges of the second plate 102 and the wall 105, when the plates 101, 102, 113 are assembled. The operation of the biasing mechanisms 107, 108 are described in more detail below.

As depicted, the device 100 further comprises retaining mechanisms 116 in the form of biased tabs at the third plate 113, the retaining mechanisms 116 configured to retain at least a portion of a face (e.g. on a side opposite that depicted in FIG. 1) of the second plate 102 against at least a portion of a respective face (e.g. the ledge 103) of the first plate 101. In other words, when the plates 101, 102, 113 are assembled, the biased tabs retaining mechanisms 116 of the third plate 113 press "down" on the second plate 102 (e.g. "into" the page of FIG. 2) to bias the second plate 102 against the ledge 103. As best seen in FIG. 2, the biased tabs of the retaining mechanisms 116 of the third plate 113 are located to press "down" (e.g. "into" the page of FIG. 2) on portions of the second plate 102 that are on the ledge 103.

The device 100 further comprises a first wedge device 121 and a second wedge device 122. Each of the wedge devices 121, 122 are wedge-shaped, with a respective wide end and a respective narrow end, the wedge devices 121, 122 being generally tapered from the wide end to the narrow end (e.g. the wide end is wider than the narrow end, and/or the narrow end is narrower than the wide end). The wedge devices 121, 122 are each generally configured to move relative to the second plate 102 and to apply one or more respective forces thereto, and thereby adjust a position (e.g. rotation and/or linear translation) of the second plate 102 relative to the first plate 101, which in turn adjusts a position of a light modulator mounted to the second plate 102, relative to the first plate 101. As the first plate 101 may be mounted to a light modulating assembly for a projector, with the position of the first plate 101 being fixed relative to the light modulating assembly, when the wedge devices 121, 122 are used to move the second plate 102, a light modulator mounted thereto is moved relative to other light modulators of the light modulating assembly, which adjusts a position of pixels of a sub-image of the light modulator mounted to the second plate 102, relative to pixels of other sub-images of other light modulators of the light modulating assembly.

Operation of the wedge devices 121, 122 is next described.

The first wedge device 121 is configured to interact with a first edge 131 of the second plate 102 and move the second plate 102, relative to the first plate 101, against the one or more biasing mechanisms 107 (and/or against the one or more biasing mechanisms 108, for example during rotation, as described below).

Similarly, the second wedge device 122 is configured to interact with a second edge 132 of the second plate 102 and move the second plate 102, relative to the first plate 101, against the one or more biasing mechanisms 108, the second edge 132 of the second plate 102 being about perpendicular to the first edge 131 of the second plate 102.

As best seen in FIG. 2, when the plates 101, 102, 113 are assembled, the biasing mechanisms 107 are located in the gap 115, along a third edge 133 of the second plate 102 opposite the first edge 131, and the biasing mechanisms 107 bias the second plate 102 towards the first wedge device 121. Similarly, when the plates 101, 102, 113 are assembled, the biasing mechanisms 108 are located in the gap 115, along a fourth edge 134 of the second plate 102 opposite the second edge 132, and the biasing mechanisms 108 bias the second plate 102 towards the second wedge device 122.

The device 100 further comprises at least one first wedge device adjustment mechanism 141-1, 141-2 (referred to hereafter as the first wedge device adjustment mechanism 141 and/or the first wedge device adjustment mechanisms 141) configured to adjust a position of the first wedge device 121, relative to the first edge 131, to move the second plate 102. As depicted, the first wedge device adjustment mechanism 141 comprises: a first screw (e.g. the first wedge device adjustment mechanism 141-1) to rotate the first wedge device 121 against a pivot 171, to rotate the second plate 102; and a second screw (e.g. the first wedge device adjustment mechanism 141-2) configured to slide the first wedge device 121 along the first edge 131 of the second plate 102, to linearly move the second plate 102 in a direction perpendicular to a movement direction of the first wedge device 121.

The device 100 further comprises at least one second wedge device adjustment mechanism 142 configured to adjust a position of the second wedge device 122 relative to the second edge 132, to move the second plate 102. As depicted, the at least one second wedge device adjustment mechanism 141 comprises a screw 142 configured to slide the second wedge device 122 along the second edge 132 of the second plate 102, to linearly move the second plate 102 in a direction perpendicular to a movement direction of the second wedge device 122. While, as depicted, at least one second wedge device adjustment mechanism 142 includes only one screw and no mechanism to rotate the second plate 102, in other examples, at least one second wedge device adjustment mechanism 142 may include a mechanism similar to the at least one first wedge device adjustment mechanism 141-1 to rotate the second plate 102, for example around a different rotational axis from that of the first wedge device adjustment mechanism 141-1.

In general, the first wedge device 121 may rotate the second plate 102, relative to the first plate 101, against the one or more biasing mechanisms 107, 108, when the first wedge device 121 interacts with the first edge 131 via at the least one first wedge device adjustment mechanism 141-1 adjusting the position of the first wedge device 121.

For example, the at least one first wedge device adjustment mechanism 141-1 is configured to rotate the first wedge device 121, when the at least one first wedge device adjustment mechanism 141-1 is adjusted against the pivot 171 of the first plate 101, extending from the respective edge 181 of the first plate 101, which causes the second plate 102 to rotate against the one or more biasing mechanisms 107, 108.

In particular, the at least one first wedge device adjustment mechanism 141-1 comprises an adjustable screw which extends from the respective edge 181 of the first plate 101 at an end opposite that of the pivot 171, the first wedge device 121 rotating against the pivot 171 when the adjustable screw is adjusted, which causes the second plate 102 to rotate against the one or more biasing mechanisms 107, 108. For example, as depicted the adjustable screw (e.g. the first wedge device adjustment mechanism 141-1) is held in place by a bracket 145 which includes a threaded hole 146 (indicated by dotted lines in FIG. 2) the adjustable screw being turned into and out of the threaded hole 146 to rotate the first wedge device 121 against the pivot 171. When the adjustable screw is turned towards the first wedge device 121, a force is exerted against the first wedge device 121 by the adjustable screw causing the first wedge device 121 and the second plate 102 to rotate. When the adjustable screw is turned away from the first wedge device 121, a force is exerted in an opposite direction onto the first wedge device 121 by the one or more biasing mechanisms 107 causing the first wedge device 121 and the second plate 102 to rotate in an opposite direction.

As depicted, each of the wedge device adjustment mechanisms 141-2, 142 comprises a respective screw which mates with a respective threaded hole 143, 144 (depicted in outline at each of the wedge devices 121, 122 in FIG. 2) at a respective wedge device 121, 122.

In particular, the at least one first wedge device adjustment mechanism 141-2 comprises an adjustable screw which interacts with an end of the first wedge device 121 (e.g. where the hole 143 is located) to slide the first wedge device 121 between the first edge 131 of the second plate 102 and the respective edge 181 of the first plate 101 (and specifically against the first wedge device adjustment mechanism 141-1 and the pivot 171), causing the first wedge device 121 to move the second plate 102 in a direction perpendicular to a movement direction of the first wedge device 121 due, for example, to the wedge shape of the first wedge device 121.

Similarly, at least one second wedge device adjustment mechanism 142 comprises an adjustable screw which interacts with an end of the second wedge device 122 (e.g. where the hole 144 is located) to slide the second wedge device 122 between the second edge 132 of the second plate 102 and a respective edge 182 of the first plate 101 (and specifically against a protrusion 172 extending from the respective edge 182 which is centered on the second wedge device 122), causing the second wedge device 122 to move the second plate 102 in a direction perpendicular to a movement direction of the second wedge device 122, due, for example, to the wedge shape of the second wedge device 122.

As depicted, a respective spring 151, 152 biases each of the wedge devices 121, 122 away from the first wedge device adjustment mechanism 141-2 and the second wedge device adjustment mechanism 142, but the respective screws of the wedge device adjustment mechanisms 141-2, 142 generally hold a respective wedge device 121, 122 in an adjusted linear position; hence the springs 151, 152 generally provide stability to the wedge devices 121, 122 when adjusted to a given position. For example, the springs 151, 152 generally provide an opposing force when a respective wedge device 121, 122 is towards a respective spring 151, 152; the springs 151, 152 may further minimize backlash at threads of the screws of the wedge device adjustment mechanism 141-2, 142 and/or the holes 143, 144 for example during a change in adjustment direction of a wedge device 121, 122. In general, the respective springs 151, 152 are around a respective screw of a wedge device adjustment mechanism 141-2, 142 and located between a head of the respective screw and a wide end of a respective wedge device 121, 121.

As depicted, the respective screws of the wedge device adjustment mechanisms 141-2, 142 generally extend through respective apertures of the wall 105 to screw into the threaded holes 143, 144 of the wedge devices 121, 122. As the respective screws are turned, heads of the respective screws are held in place via the wall 105, and respective brackets 161, 162. In general, the heads of the respective screws are located between the wall 105 and a respective bracket 161, 162 such that as a respective screw is turned, a respective wedge device 121, 122 moves along a respective edge 131, 132 of the second plate 102, but the screw itself stays in a fixed position. A direction of movement of a wedge device 121, 122, relative to the second plate 102, depends on a turning direction of a respective screw.

As best seen in FIG. 1, each of the wedge devices 121, 122 are generally of a wedge shape, and are wider closer to a respective wedge device adjustment mechanism 141-2, 142 than at an opposite end. Hence, the threaded holes 143, 144 of the wedge devices 121, 122 are located at a respective wide end of a wedge device 121, 122, and a respective narrow end of a wedge device 121, 122 is opposite to the wide end and/or the threaded holes 143, 144. Put another way, each of the wedge devices 121, 122 are generally tapered, narrowing away from a respective wedge device adjustment mechanism 141-2, 142.

Such tapering may be continuous or, as depicted, discontinuous. For example, as depicted, each of the wedge devices 121, 122 may slide along a respective edge 131, 132 via one or more portions 175 that extend from a respective body of a wedge device 121, 122, that mate with a respective groove at a respective edge 131, 132, as described below with respect to FIG. 3. While only portions 175 are indicated at the first wedge device 121, similar portions are understood to be located at the second wedge device 122. The portions 175 may also contribute to the tapering and/or width of the wedge devices 121, 122. Hence, each of the wedge devices 121, 122 are tapered with the portions 175 mating with the edges 131, 132 of the second plate 102, for example via grooves.

Figure 3:
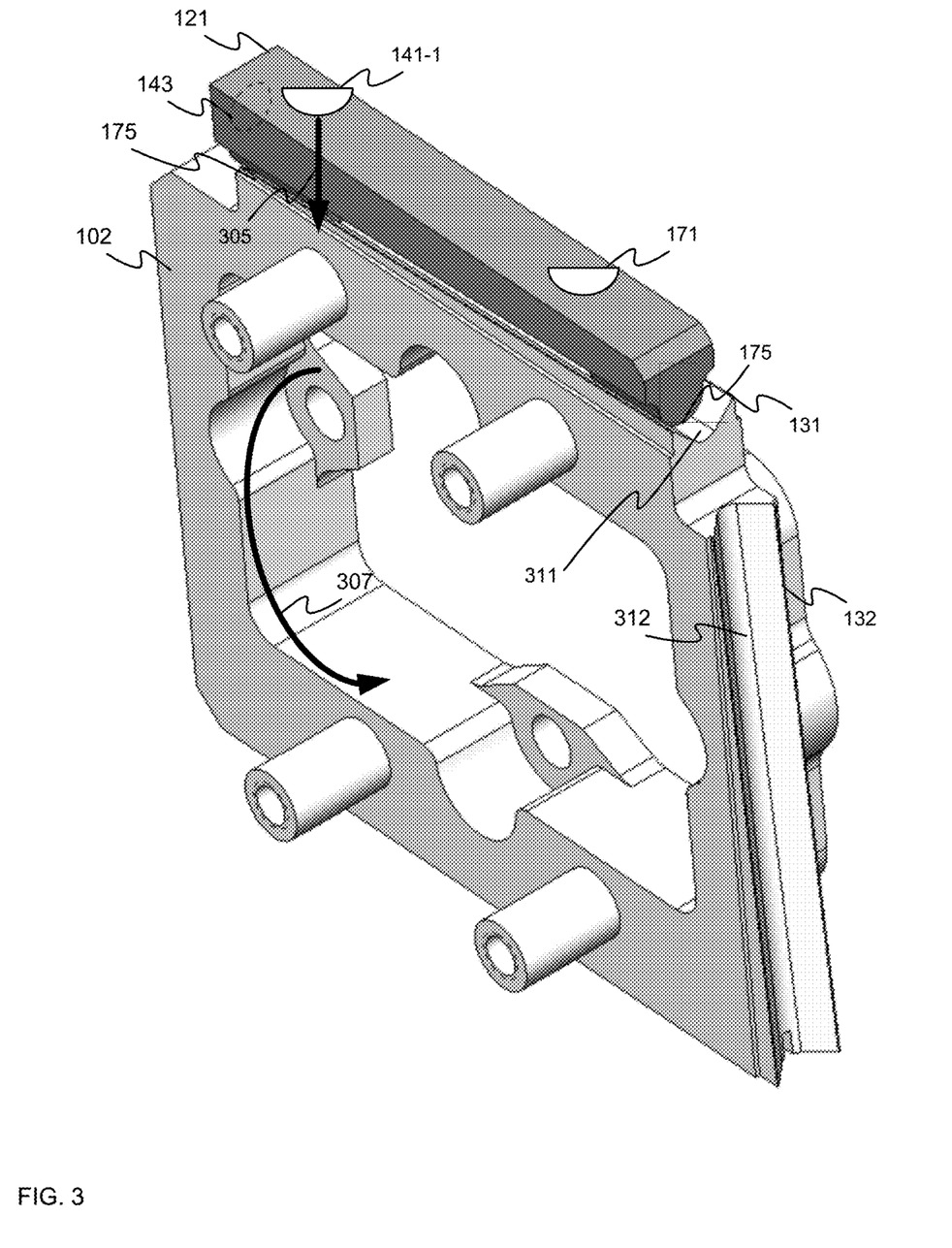
FIG. 3 depicts a wedge device and a plate of the device of FIG. 1, as well rotational adjustment of the plate to which a light modulator may be attached, according to non-limiting examples.

As best seen in FIG. 2, the first plate 101 comprises the pivot 171 and the protrusion 172. The pivot 171 generally extends from a respective edge 181 of the first plate 101. The pivot 171 is positioned such that the first wedge device 121 pivots against the pivot 171, when first wedge device adjustment mechanism 141-1 is adjusted. For example, the first wedge device 121 pivots against the pivot 171 at a side opposite the portions 175 to rotate the second plate 102. The position of the pivot 171 is hence generally fixed, relative to the first plate 101 and the first wedge device 121, as is the position of the first wedge device adjustment mechanism 141-1, relative to the pivot 171. As the first wedge device 121 is adjusted via the first wedge device adjustment mechanism 141-1, the second plate 102 is rotated, and hence a light modulator attached thereto is rotated, as best seen in FIG. 3 described in detail below.

When the first wedge device adjustment mechanism 141-2 is used to slide the first wedge device 121, the second plate 102 is adjusted linearly as described below with respect to FIG. 4.

Similarly, the protrusion 172 generally extends from the respective edge 182 of the first plate 101 (e.g. the protrusion 172 comprises a rounded extension, and/or bump and/or protuberance of the respective edge 182, however the protrusion 172 may be of any suitable shape; indeed, the protrusion 172 may not be present and the second edge device 122 may slide directly against the respective edge 182, however use of the protrusion 172 generally decreases friction in the movement of the second wedge device 122). As the protrusion 172 is centered on the second wedge device 122, when the second wedge device 122 slides along the second edge 132, the second wedge device 122 moves the second plate 102 linearly away from the second wedge device 122. The position of the protrusion 172 is generally fixed, relative to the first plate 101 and the second wedge device 122.

As described above, the first wedge device 121 is configured to rotate the second plate 102, relative to the first plate 101, against the one or more biasing mechanisms 107, 108 when the first wedge device 121 is adjusted using the first wedge device adjustment mechanism 141-1; and the first wedge device 121 is configured to linearly move the second plate 102, relative to the first plate 101, against the one or more biasing mechanisms 107, when the first wedge device 121 is adjusted using the first wedge device adjustment mechanism 141-2, as the first wedge device 121 slides along the first edge 131.

Similarly, the second wedge device 122 is configured to linearly move the second plate 102, relative to the first plate 101, against the one or more biasing mechanisms 108, when the second wedge device 122 slides along the second edge 132. To assist with the linear positioning by the second wedge device 122, the device 100 further comprises a wedge biasing mechanism 183 configured to bias the second wedge device 122 against the second plate 102; for example, as best seen in FIG. 1, the wedge biasing mechanism 183 may comprises a flat spring which extends from the third plate 113, and is positioned to bias against a side of the second wedge device 122 opposite the second edge 132 when the plates 101, 102, 113 are assembled (e.g. as best seen in FIG. 2).

In this manner, the first wedge device adjustment mechanism 141 and the first wedge device 121 may be used to adjust the second plate 102, and hence a light modulator attached thereto, rotationally and linearly relative to the second plate 102, for example to rotationally and/or linearly align and/or position pixels of a sub-image produced by the light modulator with respective pixels of sub-images produced by other light modulators of light modulator assembly of a projector into which the device 100 is integrated; similarly, the second wedge device adjustment mechanism 142 and the second wedge device 122 may be used to adjust the second plate 102, and hence the light modulator attached thereto, linearly relative to the second plate 102 (and in a linear adjustment direction perpendicular to a respective linear adjustment direction of the first wedge device 121), for example to linearly align and/or position pixels of the sub-image produced by the light modulator with the respective pixels of the sub-images produced by other light modulators of the light modulator assembly of the projector into which the device 100 is integrated.

However, in other examples, the second wedge device 122 may also rotate the second plate 102, relative to the first plate 101, against the one or more biasing mechanisms 107, 108, for example by positioning the protrusion 172 off-center from the second wedge device 122 and including another wedge device adjustment mechanism 142 similar to the wedge device adjustment mechanism 141-1; in these examples, the pivot 171, and the protrusion 172 (which acts as a pivot in these examples) may be located at different respective off-center positions, relative to a respective wedge device 121, 122, such that each wedge device 121, 122 rotates the second plate 102 around a different respective axis of rotation.

Furthermore, while the wedge device adjustment mechanisms 141, 142 are depicted as screws, and hence may be manually adjusted using a screwdriver, a hex hey, and the like, in other examples, each of the first wedge device adjustment mechanisms 141 and the second wedge device adjustment mechanism 142 may comprise one or more automated adjustment mechanisms, for example one or more respective stepper motors which turns the respective screws. In such an example, automated adjustment mechanisms may be controlled by a computing device which monitors projected images using a camera and adjusts the wedge device adjustment mechanisms 141, 142 in a feedback loop to align pixels of a sub-image produced by a light modulator attached to the second plate 102 with other sub-images produced by the projector.

Attention is next directed to FIG. 3 which depicts the second plate 102, the first wedge device 121, the first wedge device adjustment mechanism 141-1, and the pivot 171. While the other components of the device 100 are not depicted, they are nonetheless understood to be present; indeed FIG. 3 is intended to show operation of the first wedge device 121 as it rotates relative to the second plate 102.

As depicted, the first wedge device adjustment mechanism 141-2 is being adjusted to exert an off-center force 305 against the second plate 102, which causes the second plate 102 to rotate in a rotational direction 307 relative to the first plate 101, against the pivot 171, and against the biasing mechanisms 107, 108. When the first wedge device adjustment mechanism 141-2 is being adjusted in a direction opposite the force 305, the biasing mechanisms 107, 108 exert a force opposite the force 305 causing the second plate 102 to rotate in a rotational direction, against the pivot 171 opposite the rotational direction 307.

While linear movement of the first wedge device 121 is not described in FIG. 3, FIG. 3 depicts that the first edge 131 of the second plate 102 comprises a first groove 311 within which the first wedge device 121 slides (e.g. when the first wedge device adjustment mechanism 141-2 is adjusted), and the second edge 132 of the second plate 102 comprises a second groove 312 within which the second wedge device 122 (while not depicted) slides (e.g. when the second wedge device adjustment mechanism 142 is adjusted). The grooves 311, 312 may provide stability to a position of each of the wedge devices 121, 122 relative to the second plate 102; for example, example, as depicted the portions 175 of the first wedge device 121 slide in the groove 311 and further prevent the first wedge device 121 from twisting as the screw of the first wedge device adjustment mechanism 141-2 is turned in the threaded hole 143, as further assisted by the second plate 102 being generally held against the ledge 103 by the retaining mechanisms 116.

Figure 4:
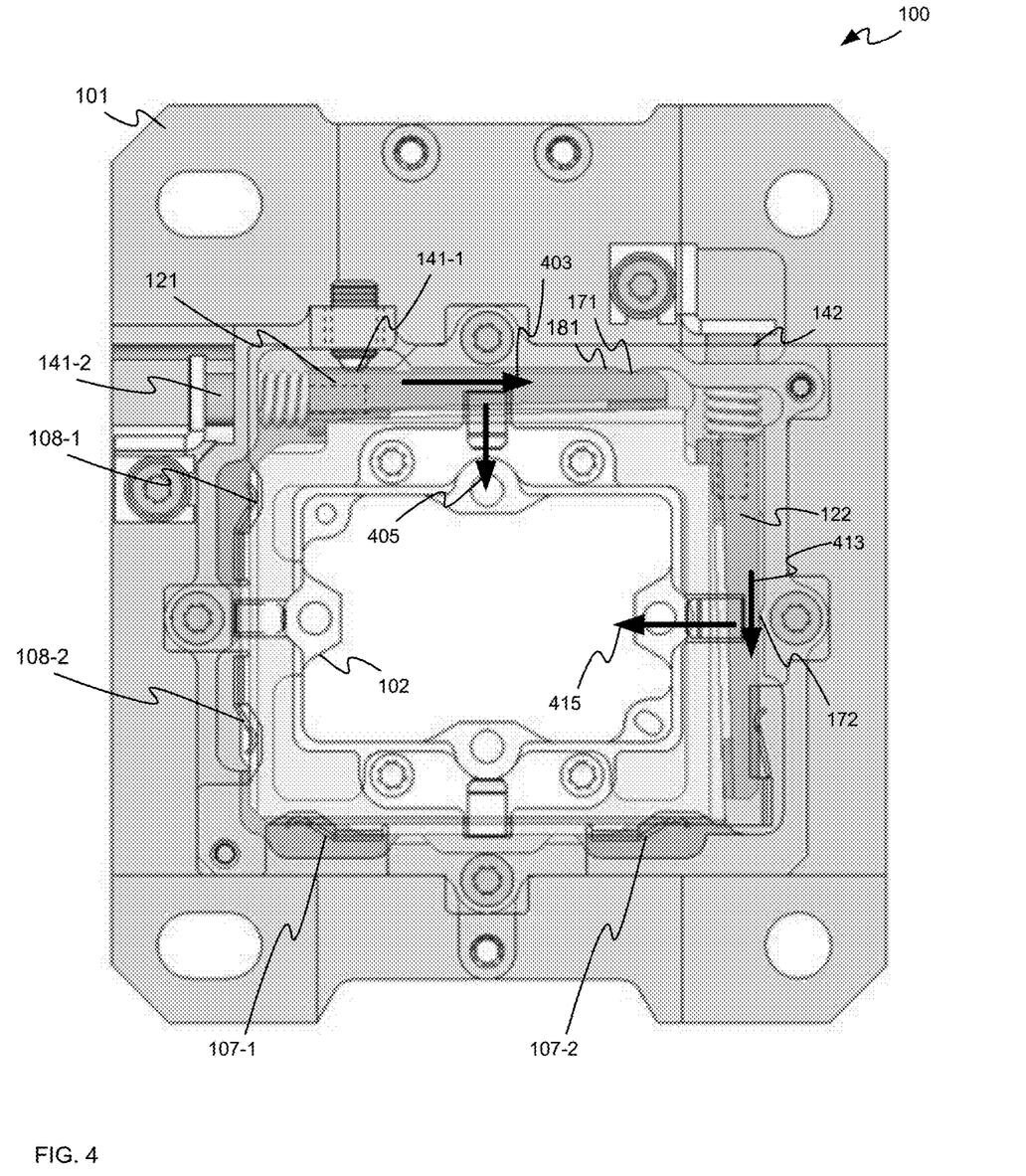
FIG. 4 depicts the wedge mechanism of the device of FIG. 1 being used to linearly adjust a plate to which a light modulator may be attached, according to non-limiting examples.

Attention is next directed to FIG. 4, which is substantially similar to FIG. 2, with like components having like numbers; while not all components of the device 100 are numbered in FIG. 4, they are nonetheless understood to be present. In particular, FIG. 4 depicts the first wedge device 121 moving in a direction 403 (e.g. along the groove 311) using the first wedge device adjustment mechanism 141-2 (e.g. and perpendicular to the force 305 of FIG. 3 and/or the direction 403 is about perpendicular to the second wedge device 122), and a centered linear force 405 is applied to the second plate 102 as a wider portion of the first wedge device 121 moves between the combination of the first wedge device adjustment mechanism 141-1 and the pivot 171. The force 405 causes the second plate 102 to move perpendicularly and linearly away from the first wedge device 121 in the direction of the force 405. When the first wedge device 121 is moved in a direction opposite the direction 403, the biasing mechanisms 108 exert a force opposite the force 405 causing the second plate 102 to move linear direction opposite the force 405.

Operation of the second wedge device 122 is also shown in FIG. 4, and occurs in a similar manner to operation of the first wedge device 121. However, as the second wedge device 122 moves (e.g. along the groove 312) in a direction 413 away from the first wedge device 121 (e.g. and perpendicular to the direction 403), a centered linear force 415 is applied to the second plate 102 due to the wedge shape of the second wedge device 122, causing the second plate 102 to move perpendicularly and linearly away from the second wedge device 122 in the direction of the force 415. When the second wedge device 122 is moved in a direction opposite the direction 413, the biasing mechanisms 108 exert a force opposite the force 415 causing the second plate 102 to move linear direction opposite the force 415.

Hence, for example, the first wedge device mechanism 141-1 may be used to rotate the second plate 102 and hence a light modulator attached thereto, and the wedge device mechanisms 141-2, 142 may be used to linearly move the second plate 102 in perpendicular directions (and hence a light modulator attached thereto), which may provide finer adjustment than conventional convergence techniques.

Hence, provided herein is a device that includes a wedge mechanism for light modulator image adjustment which may be used to make fine positional adjustments to a light modulator attached thereto, and which may be used to align pixels of a sub-image produced by the light modulator relative to pixels of other sub-images of a projector into which the device is integrated. The wedge mechanism may provide finer fine positional adjustments to the light modulator than conventional convergence techniques.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some embodiments, the terms are understood to be "within 10%," in other embodiments, "within 5%", in yet further embodiments, "within 1%", and in yet further embodiments "within 0.5%".

Persons skilled in the art will appreciate that there are yet more alternative embodiments and modifications possible, and that the above examples are only illustrations of one or more embodiments. The scope, therefore, is only to be limited by the claims appended hereto.

We claim:

1. A device comprising:
a first plate;
a second plate adapted for receiving a light modulator;
one or more biasing mechanisms configured to bias the second plate in a biased position relative to the first plate, the one or more biasing mechanisms configured to allow the second plate to move with respect to the first plate;
a first wedge device configured to interact with a first edge of the second plate to move the second plate, relative to the first plate, against the one or more biasing mechanisms;
a second wedge device configured to interact with a second edge of the second plate to move the second plate, relative to the first plate, against the one or more biasing mechanisms, the second edge of the second plate being about perpendicular to the first edge of the second plate;
at least one first wedge device adjustment mechanism configured to adjust a position of the first wedge device relative to the first edge, to move the second plate; and
at least one second wedge device adjustment mechanism configured to adjust a position of the second wedge device relative to the second edge, to move the second plate.

2. The device of claim 1, wherein the first wedge device rotates the second plate, relative to the first plate, against the one or more biasing mechanisms, when the first wedge device interacts with the first edge via the at least one first wedge device adjustment mechanism adjusting the position of the first wedge device.

3. The device of claim 1, wherein the at least one first wedge device adjustment mechanism is configured to rotate the first wedge device, when the at least one first wedge device adjustment mechanism is adjusted against a pivot of the first plate, extending from a respective edge of the first plate, which causes the second plate to rotate against the one or more biasing mechanisms.

4. The device of claim 3, wherein the at least one first wedge device adjustment mechanism comprises an adjustable screw which extends from the respective edge of the first plate at an end opposite that of the pivot, the first wedge device rotating against the pivot when the adjustable screw is adjusted, which causes the second plate to rotate against the one or more biasing mechanisms.

5. The device of claim 1, wherein the at least one first wedge device adjustment mechanism comprises an adjustable screw which interacts with an end of the first wedge device to slide the first wedge device between the first edge of the second plate and a respective edge of the first plate, causing the first wedge device to move the second plate in a direction perpendicular to a movement direction of the first wedge device.

6. The device of claim 1, wherein the at least one second wedge device adjustment mechanism comprises an adjustable screw which interacts with an end of the second wedge device to slide the second wedge device between the second edge of the second plate and a respective edge of the first plate, causing the second wedge device to move the second plate in a direction perpendicular to a movement direction of the second wedge device.

7. The device of claim 1, further comprising a wedge biasing mechanism configured to bias the second wedge device against the second plate.

8. The device of claim 1, wherein the first edge of the second plate comprises a first groove within which the first wedge device slides, and the second edge of the second plate comprises a second groove within which the second wedge device slides.

9. The device of claim 1, wherein the at least one first wedge device adjustment mechanism comprises: a first screw configured to rotate the first wedge device against a pivot to rotate the second plate; and a second screw configured to slide the first wedge device along the first edge of the second plate, to move the second plate in a direction perpendicular to a movement direction of the first wedge device.

10. The device of claim 1, wherein the at least one second wedge device adjustment mechanism comprises a screw configured to slide the second wedge device along the second edge of the second plate, to move the second plate in a direction perpendicular to a movement direction of the second wedge device.

11. The device of claim 1, wherein each of the first wedge device adjustment mechanism and the second wedge device adjustment mechanism comprises one or more automated adjustment mechanisms.

12. The device of claim 1, further comprising a retaining mechanism configured to retain at least a portion of a face of the second plate against at least a portion of a respective face of the first plate.

13. The device of claim 1, wherein each of the first wedge device and the second wedge device are respectively biased away from the first wedge device adjustment mechanism and the second wedge device adjustment mechanism.

* * * * *

UNITED STATES PATENT AND TRADEMARK OFFICE
CERTIFICATE OF CORRECTION

PATENT NO. : 11,187,892 B2
APPLICATION NO. : 16/512768
DATED : November 30, 2021
INVENTOR(S) : Guo Qing He It is certified that error appears in the above-identified patent and that said Letters Patent is hereby corrected as shown below:

On the Title Page

Item [73], delete "CHRISTINE DIGITAL SYSTEMS USA, INC." and insert --CHRISTIE DIGITAL SYSTEMS USA, INC.--

Signed and Sealed this
Sixteenth Day of August, 2022

Katherine Kelly Vidal
*Director of the United States Patent and Trademark Office*